(12) United States Patent
Netsch et al.

(10) Patent No.: US 6,730,190 B1
(45) Date of Patent: *May 4, 2004

(54) METHOD FOR MAKING WATER ACTIVATABLE DEVICE

(75) Inventors: Bryan A. Netsch, 444 Remington Pt., Lewisville, TX (US) 75067; Mark H. Bailey, Trophy Club, TX (US)

(73) Assignee: Bryan A. Netsch, Lewisville, TX (US)

( * ) Notice: Subject to any disclaimer, the term of this patent is extended or adjusted under 35 U.S.C. 154(b) by 88 days.

This patent is subject to a terminal disclaimer.

(21) Appl. No.: 10/099,917

(22) Filed: Mar. 15, 2002

Related U.S. Application Data

(63) Continuation-in-part of application No. 09/388,095, filed on Sep. 1, 1999, now Pat. No. 6,364,993.

(51) Int. Cl.[7] .......................... B32B 27/08; B32B 31/12
(52) U.S. Cl. .................... 156/277; 156/278; 156/308.2; 427/385.5; 427/393.5; 427/397.7; 428/199; 428/207; 428/211; 428/481
(58) Field of Search ................. 156/277, 278, 156/308.2, 324; 427/164, 384, 385.5, 393.5, 397.7; 428/199, 201, 207, 211, 341, 342, 481

(56) References Cited

U.S. PATENT DOCUMENTS

| | | | |
|---|---|---|---|
| 4,810,562 A | | 3/1989 | Okawa et al. |
| 4,935,307 A | * | 6/1990 | Iqbal et al. ................. 428/500 |
| 5,163,846 A | | 11/1992 | Lee |
| 5,418,264 A | | 5/1995 | Obloh et al. |
| 5,424,120 A | | 6/1995 | Culbertson |
| 5,552,519 A | | 9/1996 | Hemmings et al. |
| 5,743,946 A | | 4/1998 | Aoki et al. |
| 5,837,351 A | | 11/1998 | Chernovitz et al. |
| 5,958,579 A | | 9/1999 | Idei et al. |
| 6,090,482 A | | 7/2000 | Kawashima et al. |
| 6,228,804 B1 | | 5/2001 | Nakashima |
| 6,364,993 B1 | * | 4/2002 | Netsch et al. ................. 156/277 |
| 6,416,853 B1 | * | 7/2002 | Nakashima et al. ...... 428/313.9 |

FOREIGN PATENT DOCUMENTS

DE 19502031 A1 7/1996

OTHER PUBLICATIONS

W.D. Kingery, H.K. Bowen, D.R. Uhlmann, Introduction to Ceramics, Second Edition, p. 662, A Wiley–Interscience Publication, Introduction to Ceramics, Refractive Indices of Some Glasses and Crystals, Sillimanite, $Al_2O_3$ $SiO_2$ 1.65, Mullite, $3Al_2O_3$ 1.64.

Irving Skeist, PH.D., Handbook of Adhesives, Third Edition, Chapman & Hall, New York, NY, p. 559 Resins for Elastomer–Based Adhesives.

* cited by examiner

Primary Examiner—Curtis Mayes
(74) Attorney, Agent, or Firm—Luedeka, Neely & Graham, PC

(57) ABSTRACT

An in-line method for making a water-activatable laminate. The method includes providing a polymeric film having a first surface and a second surface. An opaque water activatable material containing from about 5 to about 40 wt. % pigment and from about 60 to about 95 wt. % binder is applied to the first surface of the film using an in-line coating technique selected from a flexographic coater, a rotary screen press, and a rotogravure coating technique. The coating is then dried to provide a single water activatable opaque layer having a thickness ranging from about 0.60 mil to about 2.0 mil. The binder for the opaque coating layer includes a mixture of solvent, butyl acetate, ethylene glycol monobutyl ether and propylene glycol. The laminate may be used multiple times without adversely affecting its ability to reveal and hide images.

14 Claims, 2 Drawing Sheets

METHOD FOR MAKING WATER ACTIVATABLE DEVICE

RELATED APPLICATION

This application is a continuation-in-part of application Ser. No. 09/388,095, now U.S. Pat. No. 6,364,993, filed Sep. 1, 1999.

FIELD OF THE INVENTION

The invention relates to a water activatable layer on a substrate, to methods for producing a substrate containing a water activatable layer and to laminates made using a material containing a water activatable layer.

BACKGROUND OF THE INVENTION

Relatively inexpensive novelty items containing hidden images are produced in large quantities and are used in a variety of applications including game pieces, food packaging prizes, educational children's books and the like. Many of these items contain full color hidden images. The images may be developed or revealed by applying a developer or solvent to the hidden image area of the object. The disadvantage of many of these items is that the object can only be used once, and once the image is revealed, the object no longer has significant appeal. Another disadvantage of such objects is that the developer or solvent is often toxic or hazardous and thus could be dangerous when used by unsupervised children or infants.

In order to overcome the problems associated with the use of toxic developers or solvents, objects containing water activatable coatings were developed. When dry, the coatings are substantially opaque and thus effectively hide an underlying image from view. However, upon wetting the coating with water, the underlying image is revealed or is provided with full vibrant color. Once the object again dries, the coating becomes opaque and thus again hides the image from view. While such objects and image developers are less toxic than the solvents and developers used for other latent image objects, it is difficult to produce such objects in a cost effective manner in quantities which enable reasonable profits to the manufacturers and distributors thereof.

Despite the advances in the art of printing hidden or latent images, there remains a need for a cost effect material and method for applying the material to a substance to produce vibrant full color images upon activation.

SUMMARY OF THE INVENTION

Considering the foregoing, the present invention provides an in-line method for making a water-activatable laminate. According to the method, a polymeric film having a first surface and a second surface is provided. An opaque water activatable material containing from about 5 to about 40 wt. % pigment and from about 60 to about 95 wt. % binder is applied to the first surface of the film using an in-line coating technique selected from a flexographic coater, a rotary screen press, and a rotogravure coating technique. The coating is then dried to provide a single water activatable opaque layer having a thickness ranging from about 0.60 mil to about 2.0 mil. The binder for the opaque coating layer includes a mixture of solvent, butyl acetate, ethylene glycol monobutyl ether and propylene glycol.

An important advantage of the invention is that only a single opaque layer is required for hiding the underlying image. Unlike prior art techniques which require the use of a black or dark pigment, the opaque layer of the invention is devoid of such black or dark pigments. Also, the opaque coating may be produced in high volume using the techniques described herein. Another advantage of the invention is that the opaque coated film may be applied to a variety of substrates containing images which may be black and white or full color images. Still another advantage of the invention is that the image containing substrate and film containing an opaque layer may be produced separately in the same or remote locations and combined later into a single composite material, and the opaque coating may be produced in high volume using the techniques described herein.

BRIEF DESCRIPTION OF THE DRAWINGS

Further features and advantages of the invention will become apparent by reference to the detailed description when considered in conjunction with the figures, which are not to scale, wherein like reference numbers indicate like elements through the several views, and wherein.

DETAILED DESCRIPTION OF THE PREFERRED EMBODIMENTS

Figure 1:
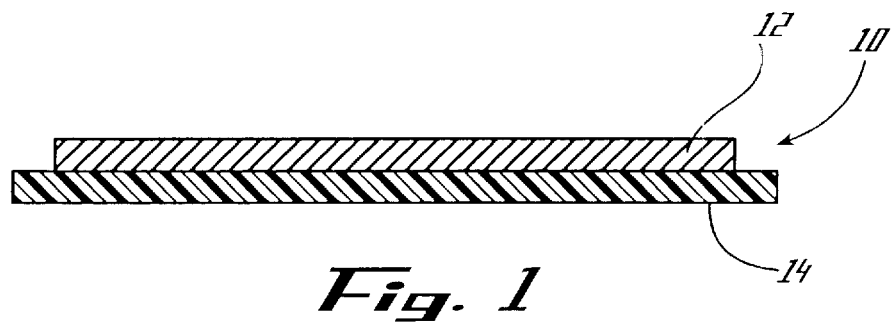
FIG. 1 is a cross-sectional view, not to scale, of an opaque film material according to the invention.

With reference to FIG. 1, the invention provides an opaque film material 10 containing an opaque layer 12 coated onto a substantially transparent material 14 as by an in-line coating or printing process such as rotogravure, rotary screen or flexographic printing. The transparent material 14 may be selected from glass, fiberglass or a flexible polymeric film. Preferably the transparent material is a polymer, copolymer or polyester film, most preferably a thermoplastic polymeric film selected from the group consisting of polyethylene, polypropylene, polystyrene and polybutylene films. When a film is used as the transparent material, the film preferably has a thickness ranging from about 0.5 to about 2.5 mils and is preferably substantially transparent. A particularly preferred film is an optically clear, biaxally oriented, polystyrene film available from Wausau Coating of Wausau, Wis. The length and width of the transparent material is not critical to the invention and may be any suitable length and width which may be coated using an in-line coating technique as described above.

The term "substantially transparent" means that details of objects or images covered by such a film are essentially visible through the film as opposed to blocking all or a substantially portion of the object or image from view.

An important feature of the invention is the use of an opaque coating formulation for forming the opaque layer 12 on the transparent material 14. The coating formulation includes from about 5 wt. % to about 40 wt. % aluminum silicate and from about 60 wt. % to about 95 wt. % binder. The aluminum silicate preferably has a particle size ranging from about 1 micron to about 10 microns.

The binder of the coating formulation is preferably an aqueous-based binder containing solvent, from about 1 wt. % to about 5 wt. % butyl acetate, from about 5 wt. % to about 10 wt. % ethylene glycol monobutyl ether (butyl CELLOSOLVE) and from about 5 wt. % to about 15 wt. % propylene glycol. A preferred binder is a water-based acrylic material available from 2nd Story of Canton, Ohio under the trade name KTC coating. The binder and aluminum silicate formulation is mixed and the viscosity of the mixture is adjusted with water to produce a coatable formulation having a viscosity within the range of from about 800 to about 1500 centipoise. It is particularly preferred to adjust the viscosity of the formulation to provide a mixture which can be applied by an in-line coating technique. A formulation containing binder and aluminum silicate which has a viscosity suitable for applying by an in-line coating technique is available from 2nd Story Concepts of Canton, Ohio under the trade name KTC60-2416H.

The transparent material 14 is preferably attached to a substrate 16 containing an image to be hidden. The substrate 16 may be selected from a wide variety of materials containing an image, including, but not limited to, paper and cellulosic webs, metals, plastics, glass, ceramic and the like. It is preferred that the substrate 16 be a relatively porous material as compared to the porosity of transparent material 14. A particularly preferred substrate 16 is a paper web containing an image printed on a surface 18 thereof. The image may be printed on the surface 18 by a wide variety of printing techniques including, but not limited to, flexographic, gravure, screen and offset printing techniques.

Once the image is printed on the surface 18 of the substrate 16, the opaque film 10 is attached directly to the substrate 16 so that the printed image on surface 18 is effectively covered or hidden by the opaque layer 12 on transparent material 14. The opaque film 10 may be attached to the substrate 16 by means of an adhesive 20 or, in the case of a thermoplastic film used as transparent material 14, by thermal lamination or cohesion techniques. A preferred adhesive is selected from pressure sensitive adhesives, emulsion acrylic and the like. In the case of a thermoplastic film for transparent material 14, a particularly preferred film is a biaxally oriented polystyrene having a softening point in the range of from about 100° F. to about 200° F.

It is important that the coating of opaque layer 12 on the transparent material 14 be of sufficient thickness to effectively hide or shield the image on surface 18 of substrate 16 from visual perception. It is not required that the image be completely invisible to the unaided eye, however, detailed features of the image such as the vibrant color thereof should be sufficiently shielded from view by the opaque layer 12. In order to obtain a sufficiently hidden image on surface 18, it is preferred to apply an opaque layer 12 to transparent material 14, the opaque layer having a thickness ranging from about 0.60 mil to about 2.0 mil.

As set forth above, the opaque layer 12 is preferably applied from an aqueous mixture to the transparent layer 14 by an in-line coating technique. An in-line process enables high speed production of opaque layers 10 for reduced manufacturing costs thereof. After coating the transparent layer 14, layer 12 is dried to provide opaque film 10. Drying of layer 12 may be achieved as by use of a conventional drying tunnel using a drying temperature in the range of from about 100° F. to about 230° F.°. Because of the use of an in-line coater, a continuous film containing opaque layer 12 may be dried at a rate of about 200 to 400 feet per minute. Such a technique of coating and drying in combination provides advantageous economies of scale not heretofore obtainable by other processing techniques. For example, application of an opaque layer 12 directly to the printed substrate 16 requires an intermediate drying step for the printed image. Because the opaque film 10 may be produced in a separate process from the printing of images on substrate 16 and the two components combined later, the limiting process becomes the laminating step rather than a drying step or printing step. Lamination can typically be conducted at much higher rates than drying printed images.

Figure 3:
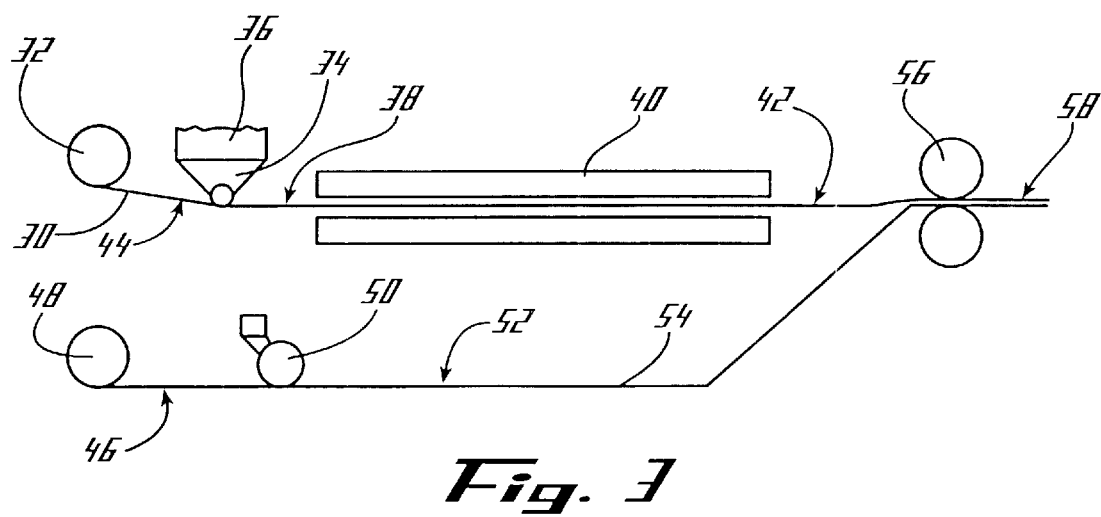
FIG. 3 is a simplified schematic for a process for making novelty items according to the invention.

Once the opaque layer 12 is sufficiently dry, the opaque film 10 may be attached to substrate 16 or coiled on a roll for later attachment to substrate 16 at a remote location. A particularly preferred process for forming a composite material containing an image hidden or shielded by opaque film 10 is illustrated schematically in FIG. 3. A transparent, flexible film 30 is provided by supply reel 32 to an in-line coater 34 containing a supply of aqueous opaque material 36 for applying to one surface of film 30 to provide coated film 38. The coated film 38 is then dried by passing film 38 through a tunnel dryer 40, preferably at a rate of from about 200 to about 400 feet per minute and at a temperature ranging from about 250° to about 350° F. The resulting opaque film 42 may be re-rolled on a storage roll for lamination to a substrate at a remote location or is preferably laminated in-line to a substrate. Film 30 may include an adhesive layer on surface 44 thereof or an adhesive layer may be applied to surface 44 thereof before or after coating film 30 with opaque material 36. In the case of a thermoplastic film 30, the opaque film 42 may be directly laminated to a substrate web by a heat lamination technique.

In the case of a continuous process for producing a composite web having a hidden image, a porous substrate, preferably a paper web 46 is provided by supply reel 48 to a printing apparatus 50 such as a flexographic, gravure, lithographic or screen printer which applies an image to surface 52 of web 46. The image containing web 54 may then be laminated to opaque film 42 as described above using laminator 56 which may be pressure rolls or heated pressure rolls and the like. The resulting composite web 58 contains an image covered or hidden by opaque film 42.

Figure 2:
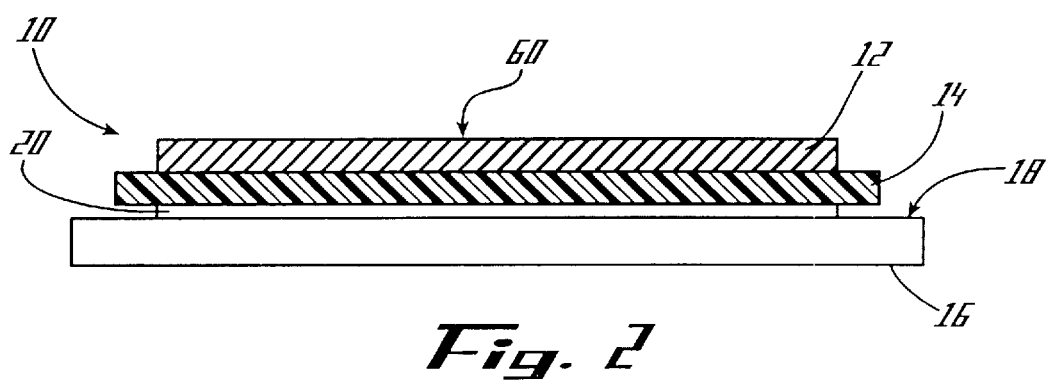
FIG. 2 is a cross-sectional view, not to scale, of a substrate containing an opaque film material according to the invention.
Figure 4:
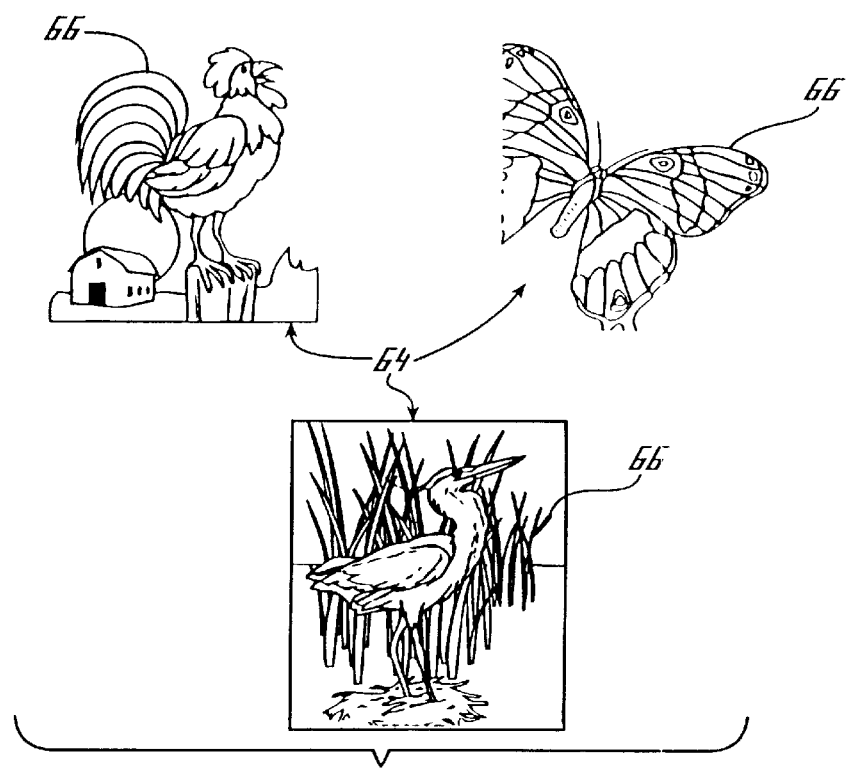
FIG. 4 is an illustration of a laminate containing images having hidden features.
Figure 5:
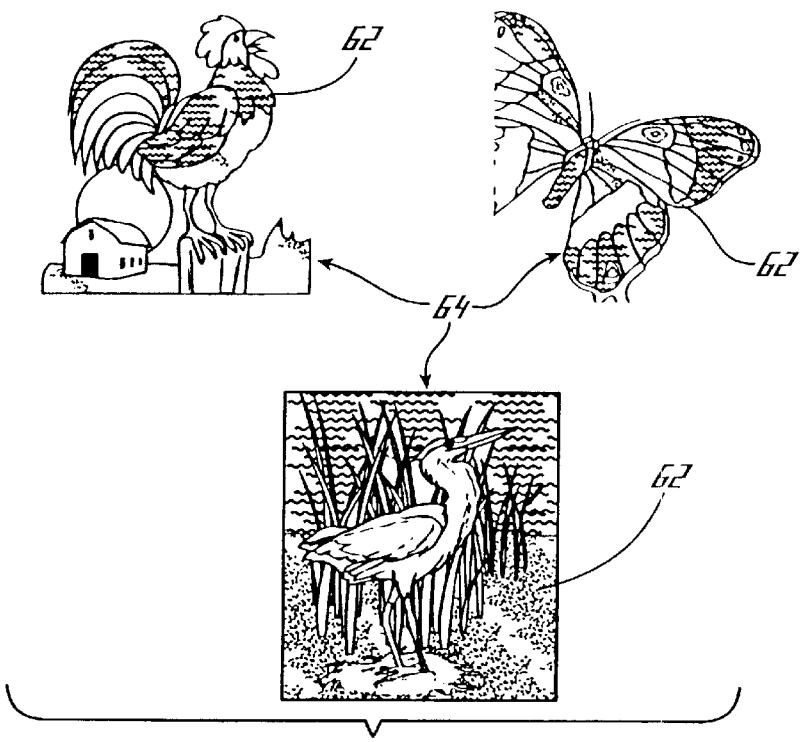
FIG. 5 is an illustration of a laminate containing images wherein previously hidden image features are revealed.

Upon wetting surface 60 (FIG. 2) of composite web 58, features of the image become visible to the unaided eye. Such features may include detailed lines or additional printed images, vibrant colors and the like. The features hidden from view by the opaque layer 12 according to the invention may be seen by comparing the images of FIG. 4 with the images of FIG. 5. Upon wetting the opaque layer 12, features such as lines and colors 62 in images 64 may be clearly seen. Upon drying, the lines and colors are again effectively hidden from view as shown in FIG. 4. The composite web 58 may therefore be used multiple times without adversely affecting subsequent image development by wetting opaque layer 12.

As also seen in FIG. 4, the opaque layer 12 may also contain indicia, lines or images 66 which are visible without wetting layer 12. These printed indicia, lines or images 66 may be enhanced by the underlying hidden color or images or may be used merely to indicate the location of the hidden images.

While the invention has been described in detail, it is to be expressly understood that various changes of form, design or arrangement may be made to the invention by those skilled in the relevant art without departing from the spirit and scope of the invention. Therefore, the above mentioned description is to be considered exemplary, rather than limiting, and the scope of the invention is defined by the following claims.

What is claimed is:

1. An in-line method for making a activatable laminate comprising providing a polymeric film having a first surface and a second surface, applying an opaque water activatable material containing from about 5 to about 40 wt. % pigment and from about 60 to about 95 wt. % binder to the first surface of the film using an in-line coating technique selected from the group consisting of a flexographic coater, a rotary screen press, and a rotogravure coater and drying the water activatable material to provide a single water activatable opaque layer having a thickness ranging from about 0.60 mil to about 2.0 mil, wherein the binder comprises a mixture of solvent, butyl acetate, ethylene glycol monobutyl ether and propylene glycol.

2. The method of claim 1 wherein the water activatable material comprises a mixture of aluminum silicate and binder, the mixture having a viscosity ranging from about 800 centipoise to about 1500 centipoise.

3. The method of claim 1 wherein the polymer of the polymeric film is selected from the group consisting of polyethylene, polystyrene, polypropylene and polyester.

4. The method of claim 1 wherein the second surface of the polymeric film contains an adhesive layer, and the method further comprises the step of applying the polymeric film to a substrate with the adhesive.

5. The method of claim 4 wherein the substrate contains an image thereon and the film is applied to the substrate in a manner sufficient to effectively cover the image and limit visual perception thereof.

6. The method of claim 5 wherein the substrate comprises a porous substrate.

7. The method of claim 1 wherein the polymeric film is a thermoplastic film, further comprising cohesively bonding the polymeric film to a substrate by a heat lamination process.

8. The method of claim 7 wherein the substrate comprises a porous substrate.

9. A method for making a novelty item containing a water revealable image, the method comprises the steps of providing a porous web, printing an image on a surface of the web, applying an opaque water activatable coating containing from about 5 to about 40 wt. % pigment and from about 60 to about 95 wt. % binder to a first surface of a polymeric film by means of an in-line coating technique, wherein the binder comprises a mixture of solvent, butyl acetate, ethylene glycol monobutyl ether and propylene glycol, drying the coating to obtain an opaque layer on the film to provide a single water activatable opaque layer having a thickness ranging from about 0.60 mil to about 2.0 mil, and laminating the film to the porous web so that the image is between the porous web and a second surface of the film and the opaque layer is exposed.

10. The method of claim 9 wherein the water activatable material comprises a mixture of aluminum silicate and binder, the mixture having a viscosity ranging from about 800 centipoise to about 1500 centipoise.

11. The method of claim 9 wherein the polymer of the polymeric film is selected from the group consisting of polyethylene, polypropylene, polystyrene and polyester.

12. The method of claim 9 wherein the second surface of the polymeric film contains an adhesive layer.

13. The method of claim 9 wherein the polymeric film is a thermoplastic film and the film and web are laminated by heating the film to a temperature sufficient to form a cohesive bond between the film and web.

14. A novelty item made by the method of claim 9.

* * * * *